April 24, 1928.                    G. BARNES                    1,667,452
FISHPLATE BOND
Filed July 17, 1926
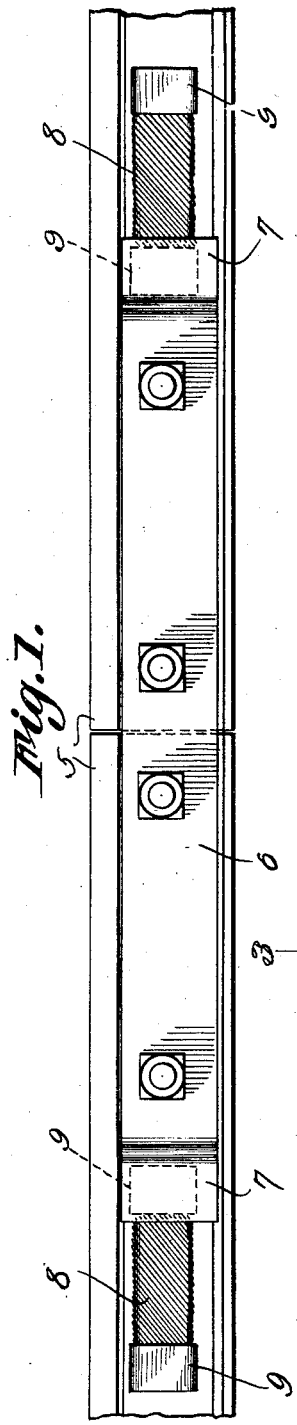
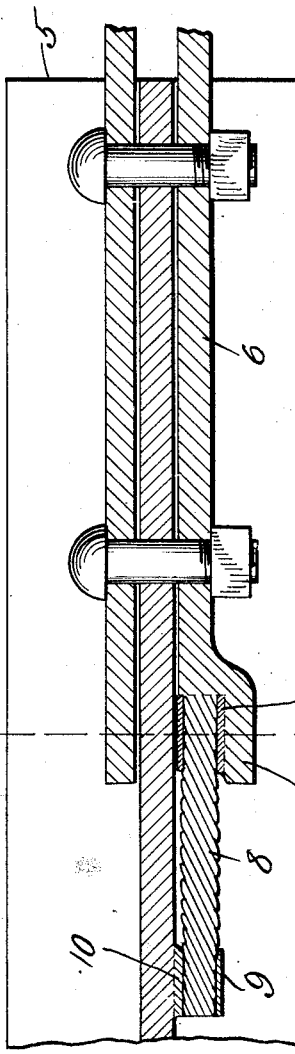
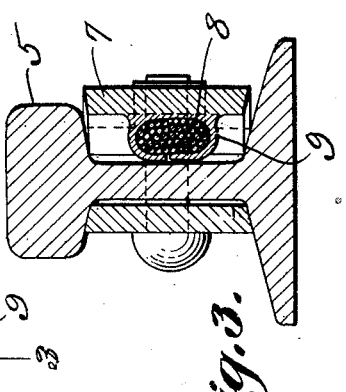
G. Barnes
Inventors,
By C. A. Snow & Co.
Attorneys.

Patented Apr. 24, 1928.

1,667,452

UNITED STATES PATENT OFFICE.

GEORGE BARNES, OF PRINCETON, INDIANA, ASSIGNOR OF ONE-THIRD TO JOSEPH G. APPLEGATH AND ONE-THIRD TO GEORGE W. JENKINS, BOTH OF PRINCETON, INDIANA.

FISHPLATE BOND.

Application filed July 17, 1926. Serial No. 123,222.

This invention relates to a novel form of fish plate bond, the primary object of the invention being to provide efficient means for electrically connecting a fish plate with the rail associated therewith, in such a way that all danger of the electrical connection becoming disconnected, is eliminated.

Another important object of the invention is to provide a fish plate having an offset end portion, the offset end portion housing one end of the wire employed in making the connection.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view illustrating a fish plate bond constructed in accordance with the invention.

Figure 2 is a longitudinal sectional view through one end of the fish plate and bond, and rail associated therewith.

Figure 3 is a sectional view taken on line 3—3 of Figure 2.

Referring to the drawing in detail, the reference character 5 indicates the abutting ends of adjacent rail sections forming a part of a track.

The fish plate bond forming the essence of the present invention is indicated by the reference character 6 and is provided with an offset portion 7 defining a recess disposed adjacent to the web of a rail, as clearly shown by Figure 3.

The wire bond which is connected with the rail and fish plate is indicated at 8, and has sleeves 9 secured at its ends, one of the sleeves 9 being positioned within the recess formed by the offset portion 7 of the fish plate 6 where the same is welded to the fish plate as clearly shown by Figure 3.

The opposite end of the wire bond 8 is welded to the rail at 10. Thus it will be seen that due to this construction, the end of the wire bond which is connected with the fish plate is housed within the recess, to the end that the connection will be protected against being knocked from its position by a tool or instrument dropped thereon.

It will further be seen that due to this construction, the wire bond 8 is supported in a direct line, making it unnecessary to bend the wire in securing the same.

I claim:

A fish plate for connecting adjacent railway rails including a body portion having lateral offset end portions, the upper and lower edges of the offset end portions lying in parallel relation with the treads and bases of the rails, a wire bond including a length of wire, sleeves connected with the ends of the wire, the sleeve at one end of the wire being positioned between the offset portion of the fish plate and the rail and welded to the offset portion, the sleeve at the opposite end of the wire being welded to a rail with which the fish plate is associated.

In testimony that I claim the foregoing as my own, I have hereto affixed my signature.

GEORGE BARNES.